(12) United States Patent
Kliskey (10) Patent No.: US 9,315,080 B1
(45) Date of Patent: Apr. 19, 2016

(54) TIRE INFLATION CAGE WITH SUPPORT MEMBERS

(71) Applicant: Summit Tool Company, Akron, OH (US)

(72) Inventor: Roger Kliskey, Akron, OH (US)

(73) Assignee: Summit Tool Company, Akron, OH (US)

( * ) Notice: Subject to any disclaimer, the term of this patent is extended or adjusted under 35 U.S.C. 154(b) by 778 days.

(21) Appl. No.: 13/650,399

(22) Filed: Oct. 12, 2012

(51) Int. Cl.
*B23Q 3/00* (2006.01)
*B60C 25/14* (2006.01)
*B60B 29/00* (2006.01)

(52) U.S. Cl.
CPC ............. *B60C 25/147* (2013.04); *B60B 29/002* (2013.01)

(58) Field of Classification Search
USPC .......................................................... 269/287
See application file for complete search history.

(56) References Cited

U.S. PATENT DOCUMENTS

| | | | | |
|---|---|---|---|---|
| 2,407,049 A * | 9/1946 | Winarsky et al. | ............ | 109/49.5 |
| 2,792,056 A * | 5/1957 | Ricketts et al. | .................... | 157/1 |
| 3,033,268 A * | 5/1962 | Schaevitz | ..................... | 157/1.26 |
| 3,630,260 A * | 12/1971 | Bailey | ........................... | 157/1.26 |
| 4,381,027 A * | 4/1983 | Molen et al. | ....................... | 157/1 |
| 4,529,019 A * | 7/1985 | Blevins et al. | ................... | 141/94 |
| 4,538,659 A * | 9/1985 | Adelman et al. | ................... | 157/1 |
| D401,210 S * | 11/1998 | Chiang | ......................... | D12/217 |
| 6,561,746 B1 * | 5/2003 | Broussard et al. | ............. | 414/500 |
| 8,333,228 B1 * | 12/2012 | Cunningham | ..................... | 157/1 |
| 8,695,674 B2 * | 4/2014 | Kliskey et al. | ..................... | 157/1 |
| 2005/0082013 A1 * | 4/2005 | White | ............................... | 157/1 |

* cited by examiner

*Primary Examiner* — Lee D Wilson
*Assistant Examiner* — Alvin Grant
(74) *Attorney, Agent, or Firm* — Renner Kenner Greive Bobak Taylor & Weber (57) ABSTRACT

A tire inflation cage includes a plurality of retention members that include spaced, substantially vertical upstanding members. The upstanding members are attached at their ends to a base and at a point along their outer surface to support members that extend at a substantially right angle from the base. The spaced retention members allow a tire assembly to be received therein and to be retained between a pair of tire stops for servicing of the tire. The substantially perpendicularly extending support members serve to increase the shear strength of the attachment of retention members to the base, thus preventing the retention member from separating from the base in the event that the tire assembly separates as it is being serviced in the inflation cage.

22 Claims, 10 Drawing Sheets

TIRE INFLATION CAGE WITH SUPPORT MEMBERS

TECHNICAL FIELD

The present invention generally relates to tire-changing and related devices. More specifically, the present invention relates to cages in which tire assemblies are maintained, repaired, or changed. In particular, the present invention relates to a tire inflation cage having retention members that are attached to a base with increased shear strength, so as to prevent the detachment of the retention members from the base when a tire and wheel retained therein separates during inflation.

BACKGROUND

Servicing tire assemblies used on large vehicles such as trucks, tractors, trailers, buses and off-road machines is generally regarded as dangerous work. Tire assemblies, whether multi-piece or single-piece, include a tire mounted on a rim or wheel, as well as various other wheel components, which are inflated to great pressure for use. However, during inflation, an improperly assembled or damaged tire and wheel may separate from each other with violent force, which may cause substantial injury to those that are nearby. As a result, retention devices have been developed that provide a barrier between the tire and wheel of a tire assembly and the service technician and other individuals who are nearby. Such retention devices typically include a cage formed as an assembly of bars that are attached to a base, as well as various other components that are configured to retain the tire assembly in the event of an explosive separation of the tire and wheel or sudden release of air from the tire assembly. Thus, due to the necessity of inflating tires, such retention devices or tire inflation cages are in widespread use.

In order to position a tire assembly within a tire inflation cage, a technician rolls an upstanding tire assembly into a space defined within the bars or retention members of the cage. Tire inflation cages also include tire stops upon their base that prevent the tire assembly from rolling out of the cage once the tire assembly is positioned, so that a portion of the tire assembly rests on the base of the cage between the tire stops. Furthermore, the tire stops are of such a dimension to allow a technician to roll a tire assembly over them as he or she positions the tire assembly within the tire inflation cage, while preventing the tire assembly from rolling out of the cage.

Once the tire assembly is positioned in the tire inflation cage, it may be repositioned in order for the components of the tire assembly to be accessible to the service technician. For example, in some instances access to the valve stem of the tire assembly may be blocked by various portions of the tire inflation cage, including by its retention members or bars. In such instances, the tire assembly is typically rolled out of the tire inflation cage, moved around, and rolled back into the tire inflation cage with the intent that the valve stem or other component will then be accessible and not blocked by the cage. Once in position, an inflation device is attached to the valve stem to inflate the tire assembly to the desired pressure and then removed from the tire inflation cage for mounting to a vehicle. However, during this tire inflation process, the tire can explode, causing it to break up into fragments, and/or the wheel may become separated from the tire and propelled with great force therefrom. That is, the tire provided by the tire assembly may separate into multiple pieces and be ejected from the tire assembly under extremely high force, which poses a serious safety hazard to those individuals in and around the tire inflation cage. As such, the cage serves to retain fragments of the exploding tire, as well as to retain the rim or wheel as it separates from the tire within the cage so that they do not come into contact with any individuals who are nearby.

Figure 1:
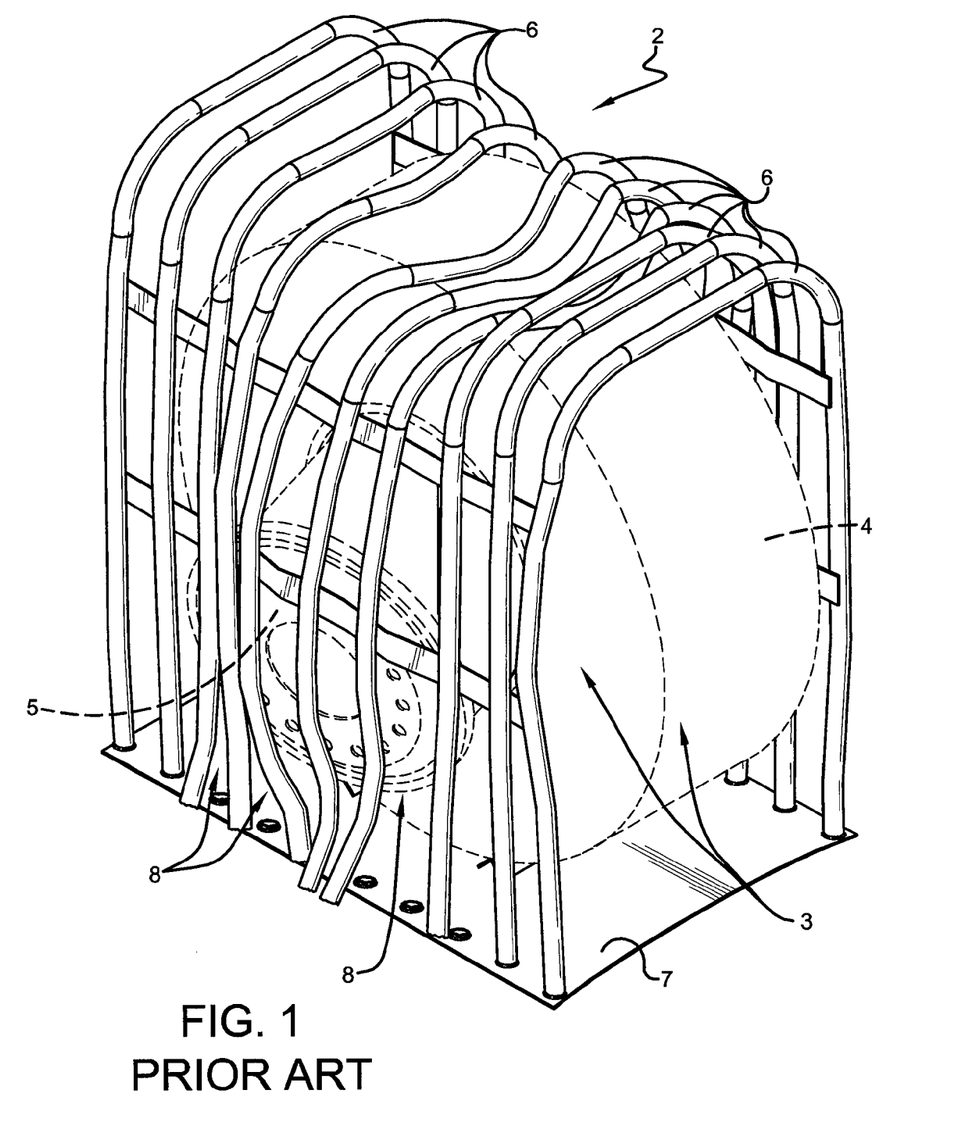
FIG. 1 is a perspective view of a prior art tire inflation cage showing a plurality of retention members torn from a base.

Unfortunately, while current tire inflation cages, such as that shown in FIG. 1, referred to by reference numeral 2, are designed to retain a tire assembly 3 that includes a tire 4 mounted on a wheel 5, such tire inflation cages 2 typically absorb the force imparted by the separation of the wheel 5 from the tire 4 by the tearing of retention members 6 or bars that form the cage 2 from the base 7 to which they are attached. Such occurrence is unsafe, as the openings 8 formed by the detachment of the bars from the base may allow the rim or wheel, or portions thereof, as well as portions of the tire, to be ejected completely from the cage. Furthermore, fragments of tearing metal could be released from the tire inflation cage itself, due to the tearing of the bars from the base, which could lead to injury to the eyes or other body part of the service technician or other nearby individual, which is unwanted.

Therefore, there is a need for a tire inflation cage that provides retention members that are attached to a base with support members, so as to increase the shear strength of the cage, so as to prevent the detachment of the retention members from the base when a tire assembly explodes during inflation.

SUMMARY OF THE INVENTION

In light of the foregoing, it is a first aspect of the present invention to provide a tire inflation cage for protecting a user when inflating a tire on a wheel. The tire inflation cage includes a plurality of spaced retention members. Each retention member includes a first upstanding member having a top end and a bottom end, and a second upstanding member spaced apart from the first upstanding member and having a top and a bottom end. Connecting the top ends of the first and second upstanding member is a cross-member connecting the top ends of the first and second upstanding member, such that the each retention member forms a space for receiving the tire and wheel therein. The tire cage also includes a first support member that is attached outside the space to at least two first upstanding members of at least two retention members proximate to the bottom ends of each first upstanding member. In addition, a second support member is also attached outside the space to at least two second upstanding members of at least two retention members that are proximate to the bottom ends of each second upstanding member. Finally, a base connects at least the first support member to at least the second support member.

In another aspect, the present invention provides that the first and second upstanding members and the cross-member are formed from a U-shaped tube.

In yet another embodiment, the present invention provides that each of the first and second support members comprise a strip of metal that includes a top and bottom edge and an inner and outer surface.

Still another embodiment of the present invention provides that wherein the inner surface of each strip of metal is attached to respective first and second upstanding members by a weld. In addition, the welds may extend between the top and bottom edges of each of the first and second support member.

In another aspect, the present invention provides that the first and second support members have a lengthwise dimension, such that the first and second support members are attached along the lengthwise dimension to the base.

Yet another aspect, the present invention provides that the first and second support members are attached to each retention member.

In another aspect, the present invention provides that the base further connects the first and second upstanding members.

Sill in a further aspect, the present invention provides that the base further connects the first and second upstanding members.

In yet another aspect, the present invention provides that a first brace is attached to at least two of the first upstanding members and a second brace is attached to at least two of the second upstanding members.

Another aspect of the present invention is that the first and second support members each include a substantially vertical support section and a substantially horizontal base section, wherein the substantially vertical support sections of both the first and second support members are attached outside the space to the at least two first and second upstanding members, respectively.

Yet another aspect of the present invention is that the base includes a flat sheet of metal attached to each substantially horizontal base section of the first and second support members.

Still in another embodiment, the present invention provides that the substantially vertical support section includes a top and bottom edge and an inner and outer surface, wherein the inner surface of each substantially vertical support section is attached to respective first and second upstanding members by a weld.

In an additional embodiment, the present invention provides that each weld extends between the top and bottom edges of each substantially vertical support section.

In another embodiment, the present invention provides that the flat sheet of metal includes an upper surface and a lower surface, such that the substantially horizontal base section of the first and second support members are attached to the upper surface of the flat sheet of metal.

Yet another embodiment of the present invention provides that the first and second support members are attached to the upper surface of the flat sheet of metal by a plurality of welds that alternate between each side of each substantially horizontal base section.

In an additional embodiment, the present invention provides that the first and second support members are attached to the upper surface of the flat sheet by at least one weld that extends along a lengthwise dimension of each substantially horizontal base section of the first and second support members.

Another aspect of the present invention provides that the flat sheet of metal includes an upper surface and a lower surface, such that the substantially horizontal base section of the first and second support members are attached to the lower surface of the flat sheet of metal.

Still, in another embodiment, the present invention provides that the first and second support members are attached to the lower surface of the flat sheet of metal by at least one weld that extends along a lengthwise dimension of each substantially horizontal base section of the first and second support members.

In another embodiment, the present invention provides that the base and the first and second support members are formed integrally as one piece without a weld between the base and the first or second support members.

Yet in another embodiment, the present invention provides that the first and second support members are each substantially vertical upturned sections of the base, and includes a top and bottom edge and an inner and outer surface, wherein the inner surface of each substantially vertical upturned section is attached to the respective first and second upstanding members by a weld.

Still in another embodiment, the present invention provides that each weld extends between the top and bottom edges of each substantially vertical upturned section.

Furthermore, in yet another embodiment, the present invention provides that each weld extends around the first or second upstanding member.

BRIEF DESCRIPTION OF THE DRAWINGS

This and other features and advantages of the present invention will become better understood with regard to the following description, appended claims, and accompanying drawings wherein:

DETAILED DESCRIPTION

A tire inflation cage is generally referred to by the numeral 10, as shown in FIGS. 2-6 of the drawings. The tire inflation cage 10 includes a base 20 having opposed upper and lower surfaces 22 and 24 that are bounded by opposed front and rear passage edges 30 and 34 and by opposed lateral edges 40 and 44. It should be appreciated that the base 20 is formed as a substantially planar section of steel or aluminum, for example, although it may have any suitable shape and may be formed from any suitable material.

Figure 3:
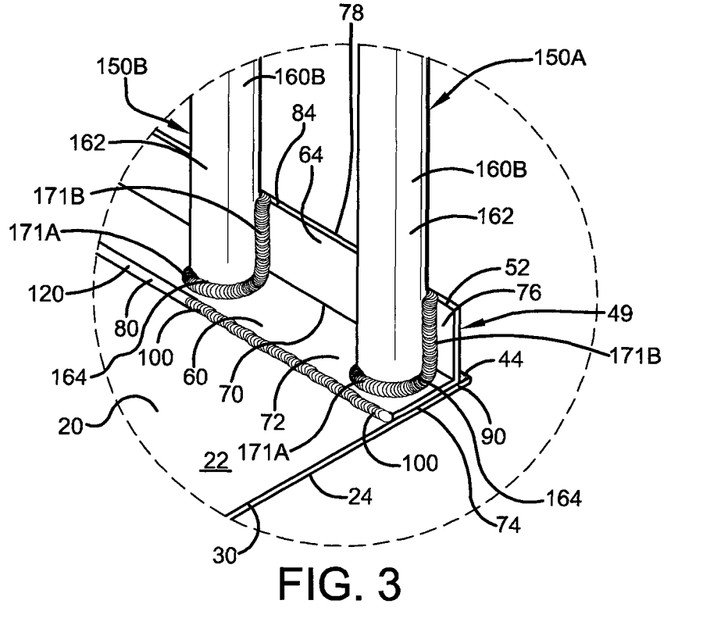
FIG. 3 is a perspective view of a plurality of retention members attached to an angle member of the tire inflation cage in accordance with the concepts of the present invention.
Figure 4:
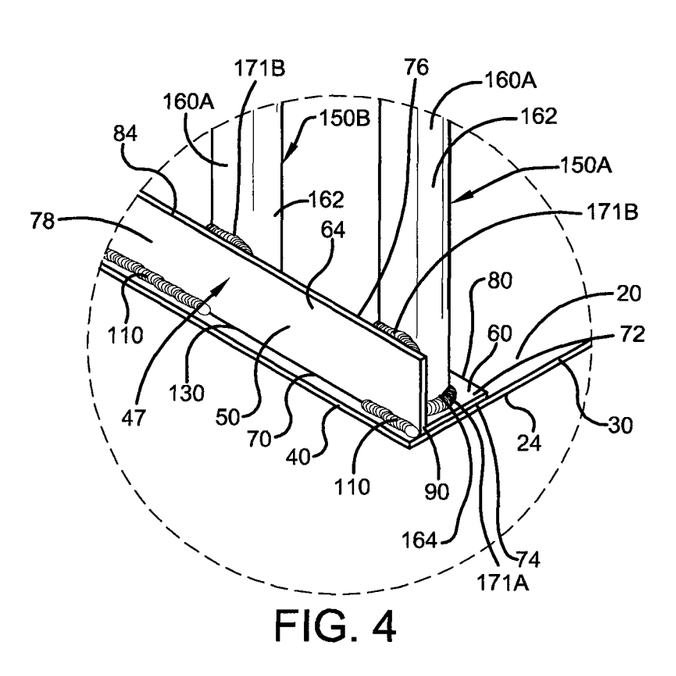
FIG. 4 is another perspective view of a plurality of the retention members attached to another angle member of the tire inflation cage in accordance with the concepts of the present invention.
Figure 5A:
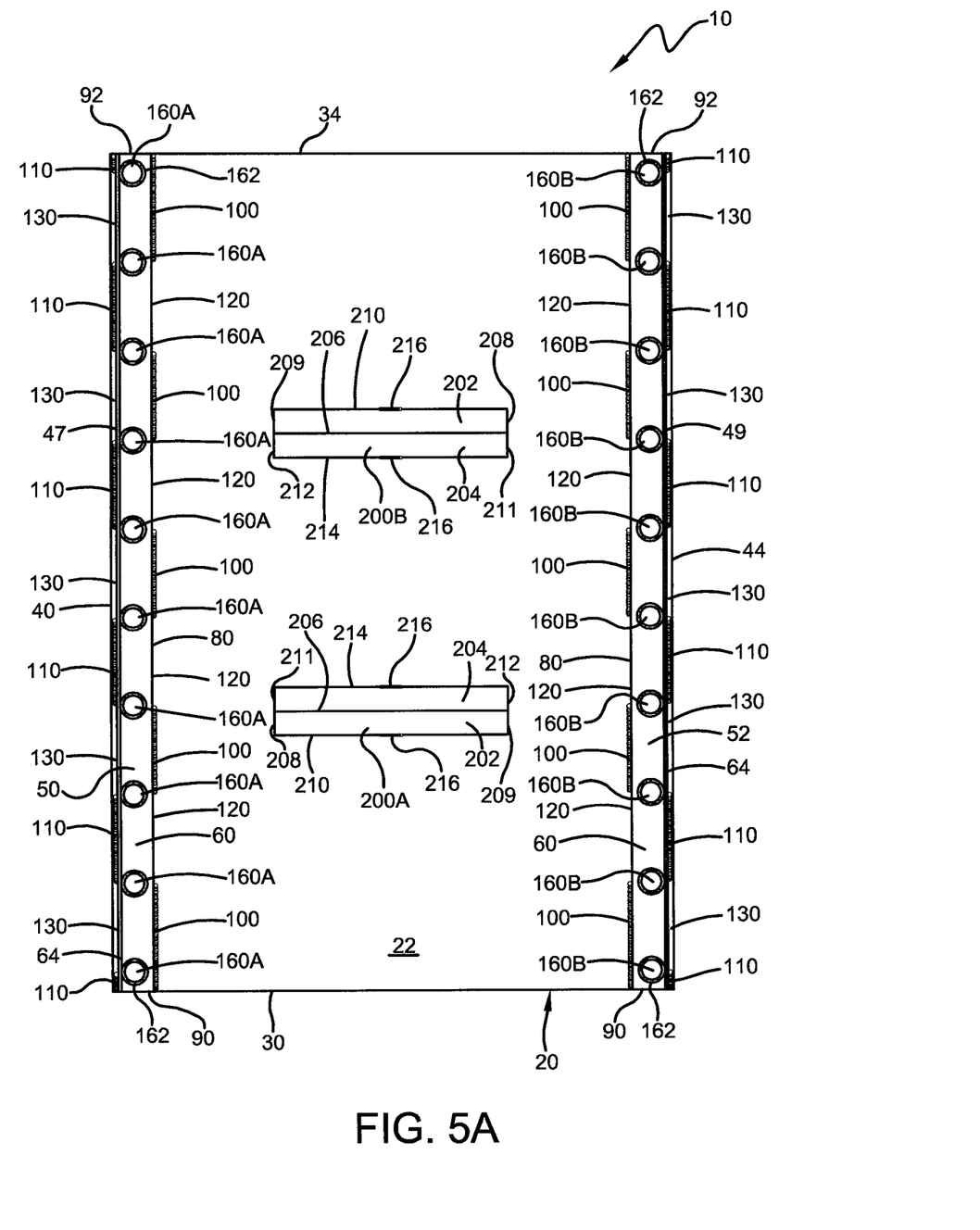
FIG. 5A is a top plan view of a base of the tire inflation cage, showing the angle members attached thereto with alternating stitch welds in accordance with the concepts of the present invention.
Figure 5B:
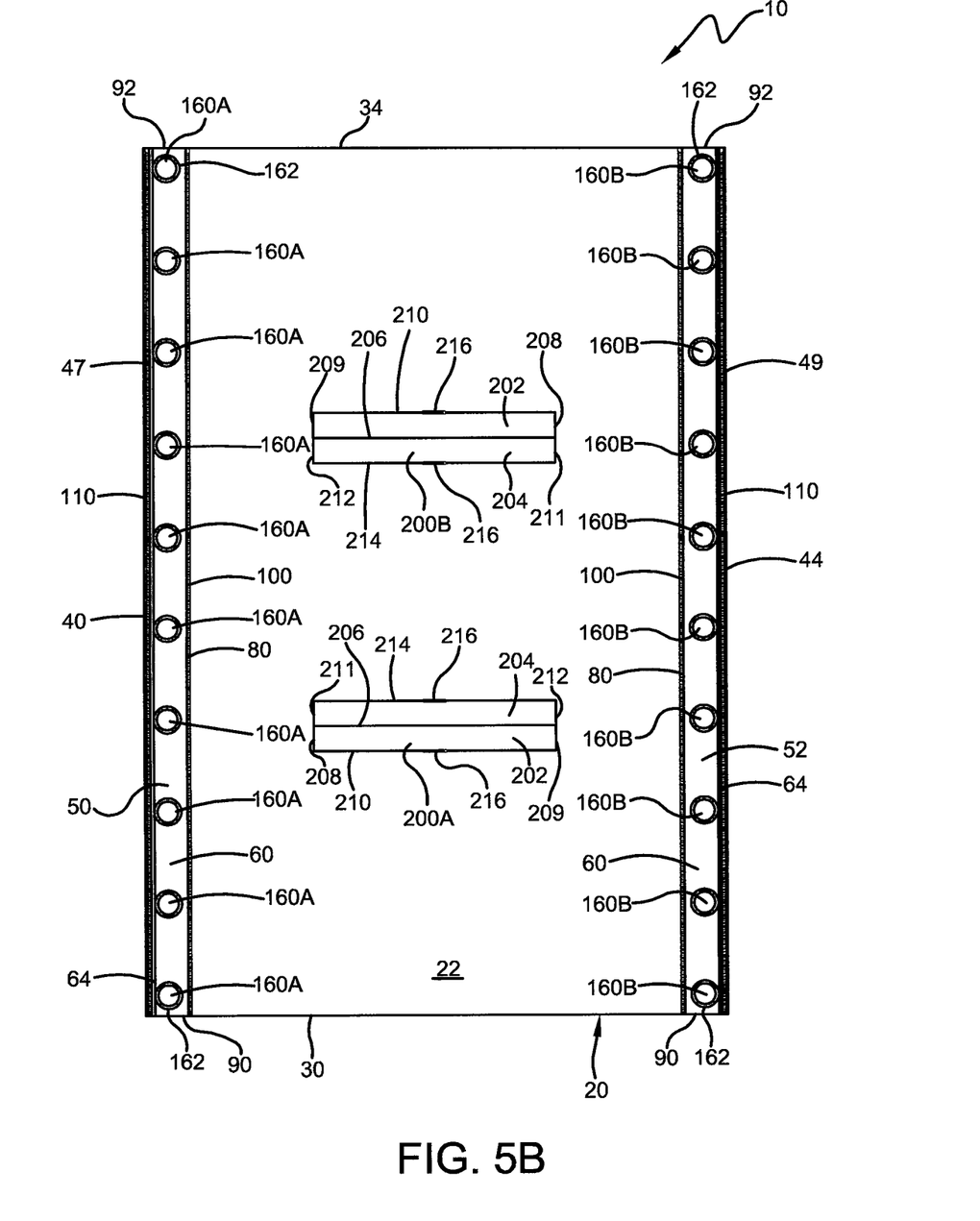
FIG. 5B is a top plan view of the base of the tire inflation cage, showing the angle members attached thereto with continuous welds in accordance with the concepts of the present invention.

In one aspect, the support members 47 and 49 may comprise respective angle members 50 and 52, as shown clearly in FIGS. 3-5, that are each comprised of an elongated section having a substantially horizontal base section 60 that is joined at a substantially right angle to a substantially vertical support section 64 at a transition edge 70. In addition, the base section 60 includes opposed inner and outer surfaces 72 and 74, while the support section includes opposed inner and outer surfaces 76 and 78. Although the base section 60 and the support section 64 are discussed herein as being oriented at a substantially right angle to each other, they may be arranged so as to be at any suitable angle relative to one another. As such, the base section 60 of the angle members 50,52 is bounded by a base edge 80 and the transition edge 70, while the support section 64 of the angle members 50,52 is bounded by a support edge 84 and the transition edge 70. In addition, each of the angle members 50,52 are terminated at opposed ends 90 and 92. Moreover, one or both of the continuous angle members 50,52 may be configured as separate sections that are attached to one or more of the upstanding members to be discussed.

Continuing, the angle members 50,52 are attached to the upper surface 22 of the base 20, such that the outer surface 74 of the base section 60 of each angle member 50,52 is adjacent to the upper surface 22 of the base 20, while the support section 64 of each angle member 50,52 is oriented so as to be proximate to respective lateral edges 40,44 of the base 20. Specifically, the angle members 50,52 are attached to the upper surface 22 of the base 20 by a first plurality or series of welds 100 that attach the base edge 80 to the upper surface 22 of the base 20 and by a second plurality or series of welds 110 that attach the transition edge 70 and/or support section 64 to the upper surface 22 of the base 20. In addition, the first and second plurality of welds 100,110 may each be spaced apart by respective first and second gaps 120 and 130, such that the first plurality of welds 100 are arranged in an alternating pattern with the second plurality of welds 110, as shown in FIG. 5A. That is, the first plurality of welds 100 are arranged so as to be substantially opposite gaps 130, while the second plurality of welds 110 are arranged so as to be substantially opposite gaps 120, thus forming a pattern of welds that alternate between the base edge 80 and the transition edge 70 of the base section 60 of each angle member 50,52. It is also contemplated that the tire inflation cage 10 may be configured, such that the first and/or second plurality of welds 100,110 are each replaced with a single continuous weld as well, as shown in FIG. 5B.

Figure 2:
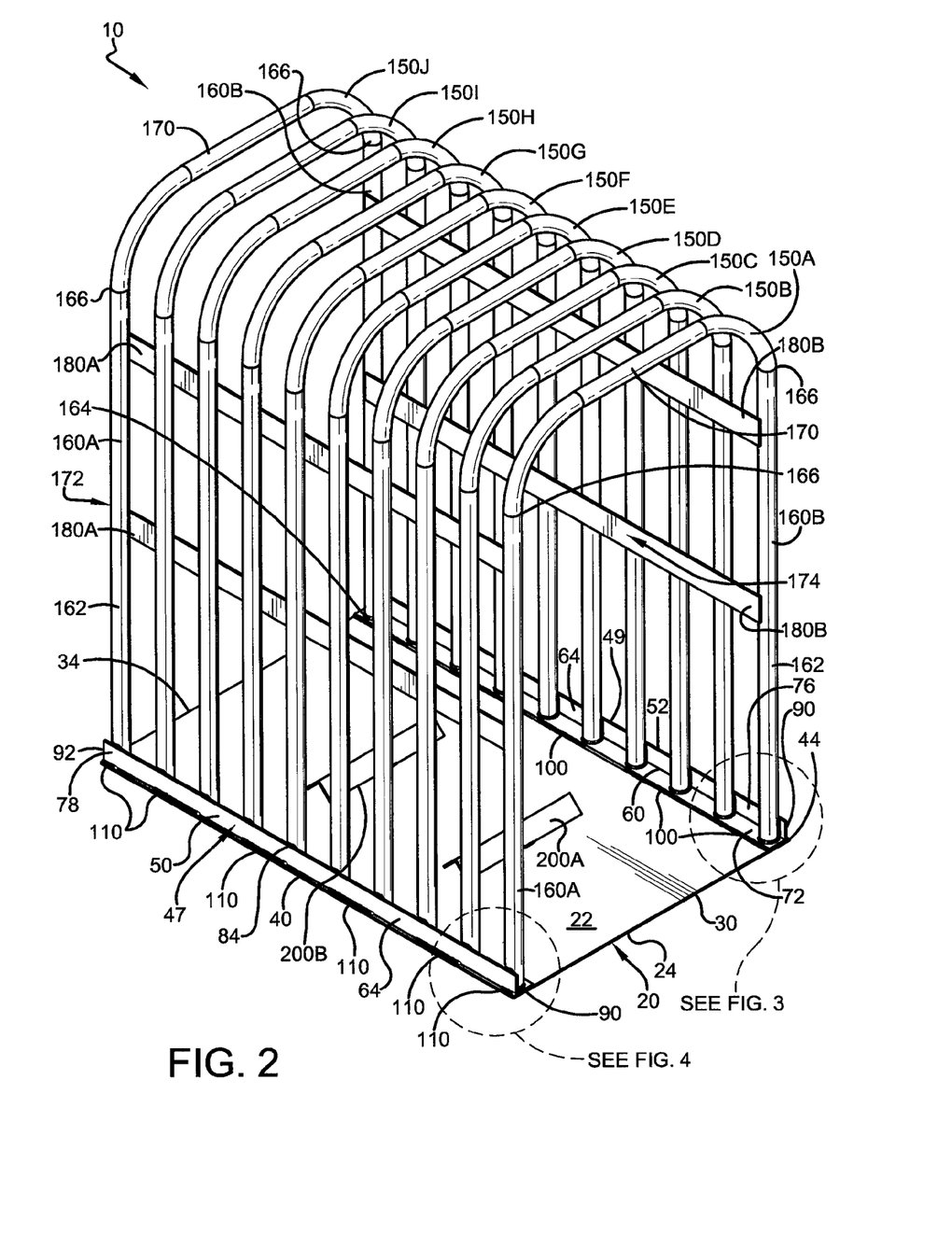
FIG. 2 is a perspective view of a tire inflation cage in accordance with the concepts of the present invention.

The tire inflation cage 10 also includes a plurality of retention members 150A-J, as shown in FIG. 2, in which each retention member 150A-J includes a pair of spaced, substantially vertical upstanding members 160A-B that have an outer surface 162 and opposed ends 164 and 166. The end 164 of the upstanding members 160A-B of each retention member 150A-J is attached to the base section 60 of respective angle members 50,52 while the end 166 of the upstanding members 160A-B are joined together by a cross-member 170, such as an at least partially arcuate member. In one aspect, it is contemplated that the cross-member 170 and upstanding members 160A-B may be formed from a single continuous U-shaped tube, which has not been welded. Specifically, the end 164 of upstanding members 160A and 160B is attached to respective angle members 50 and 52, such that the perimeter of the end 164 of the upstanding members 160A-B is attached by a weld 171A to the inner surface 72 of the base section 60 of respective angle members 50 and 52. In addition, the outer surface 162 of the upstanding members 160A-B that is proximate to the end 164 is attached by a weld 171B to the inner surface 76 of the support section 64 of respective angle members 50 and 52. As such, the plurality of spaced retention members 150A-J extending from the base 20 form a cage 172 that defines a cavity or space 174 therein. Furthermore, while the discussion presented herein sets forth the use of 10 retention members 150A-J, it should be appreciated that the cage 172 may be formed from any suitable number of retention members 150.

Thus, as shown in FIGS. 2-4, the space 174 is defined by the retention members 150A-J and the base 20, and as such, the support members 47 and 49 are positioned substantially outside of the space 174. In other words, the substantially vertical support sections 64 of the support members 47,49 are attached to the upstanding members 160A-B at a point distal to the space 174, while the edge 80 of the substantially horizontal base sections 60 of the support members 47,49 that are attached to the end 164 of the upstanding members 160A-B slightly protrudes into the space 174 defined by the base 20 and the upstanding members 160A-B. Therefore, because only a small portion of the edge of the substantially horizontal base section 60 extends into the space 174, it can be stated that the support members 47 and 49 are substantially outside of the space 174.

It should be appreciated that the retention members 150A-J may also be formed from any suitable material, such as steel or aluminum for example. Additionally, the retention members 150A-J are configured to have any suitable cross-sectional shape or dimension, such as an annular or rectangular cross-section. For example, the retention members 150A-J may be configured as tubes having a diameter of approximately 2¼ inches.

To further enhance the energy-absorbing capabilities of the tire cage 172, one or more braces 180A and 180B are respectively attached to the outer surface 162 of the upstanding members 160A and 160B. In one aspect, braces 180A and 180B may be attached to the outer surface 162 of respective upstanding members 160A and 160B at a point that is proximate to the space 174 within the cage 172, using any suitable means of attachment, such as welding for example. That is, braces 180A join the upstanding members 160A together, and braces 180B join the upstanding members 160B together. In one aspect, the braces 180A-B may comprise any suitable material such as steel or aluminum for example, and may have any suitable cross-sectional shape, such as an annular or rectangular cross-sectional shape for example.

Figure 6:
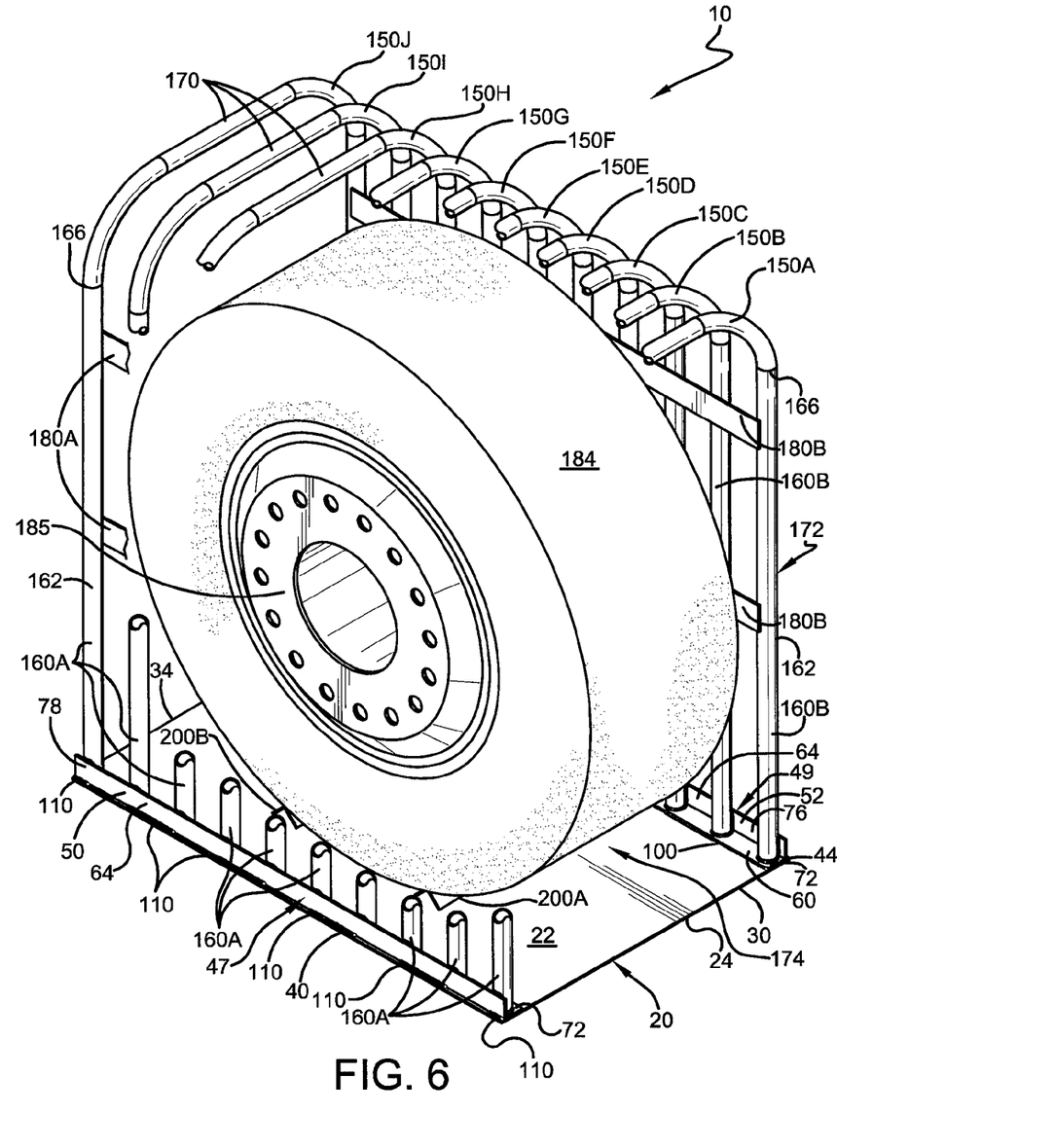
FIG. 6 is a perspective view of the tire inflation cage supporting a tire assembly therein in accordance with the concepts of the present invention.

Continuing, the space 174 defined by the retention members 150A-J or cage 172 is configured for allowing the service of a tire assembly having a tire 184 that is carried upon a rim or wheel 185, as shown in FIG. 6. To facilitate the retention of the tire 184 and wheel 185 within the cage 172, spaced tire stops 200A and 200B are attached to the upper surface 22 of the base 20. The tire stops 200A-B are equally spaced apart and are centered between front and rear passage edges 30,34 and lateral edges 40,44 of the base 20. Furthermore, the tire stops 200A-B each comprise a leading member 202 that is attached at as substantially right angle to a trailing member 204 to form a contact edge 206. In particular, each leading member 202 is bounded by lateral edges 208 and 209 and by a leading edge 210 and the contact edge 206, and may comprise any suitable material, such as steel or aluminum and have any suitable cross-sectional shape, such as a rectangular cross-section for example. Similarly, the trailing member 204 is bounded by lateral edges 211 and 212 and by a trailing edge 214 and the contact edge 206, and may comprise any suitable material, such as steel or aluminum and have any suitable cross-sectional shape, such as a rectangular cross-section for example. The leading and trailing edges 210 and 214 of each of the tire stops 200A-B are attached by welding or any other suitable means of attachment to the upper surface 22 of the base 20. In one aspect, the leading and trailing edges 210 and 214 are attached to the upper surface 22 of the base 20 by welds 216 that are centered on each of the leading and trailing edges 210,214, and which do not extend the entirety of the length of such edges 210,214, as shown in FIGS. 5A-B. As such, the contact edge 206 of each tire stops 200A-B extends upward from the upper surface 22 of the base 20, and thus serves to retain the tire 184 between the tire stops 200A-B when the tire 184 is rolled into the cage 172 for servicing by a technician. In one aspect, the tire stops 200A-B may be constructed of 3 inch×3 inch×¼ inch angle iron, and can be 15 inches long and spaced approximately 24 inches apart. It should be appreciated that the components of the cage 10 may be formed from any suitable material, including iron, steel, or aluminum for example.

It should be appreciated that the attachment of the end 164 of the upstanding members 160A-B to the inner surface 76 of the support section 64 increases the shear strength of the attachment of the retention members 150A-J to the base 20, thus preventing the retention members 150A-J from tearing away from the base 20 when the cage 172 absorbs any impact imparted by the exploding tire 184 and/or wheel 185 as it separates from the tire 184.

In another aspect, the angle members 50,52 may each be replaced, such that the support members 47,49 comprise only the substantially vertically oriented section 64, which may comprise a metal strip or section that is attached to the outside surface of two or more of the upstanding members 160A-B at a point proximate to the end 164 of the upright members.

Figure 7:
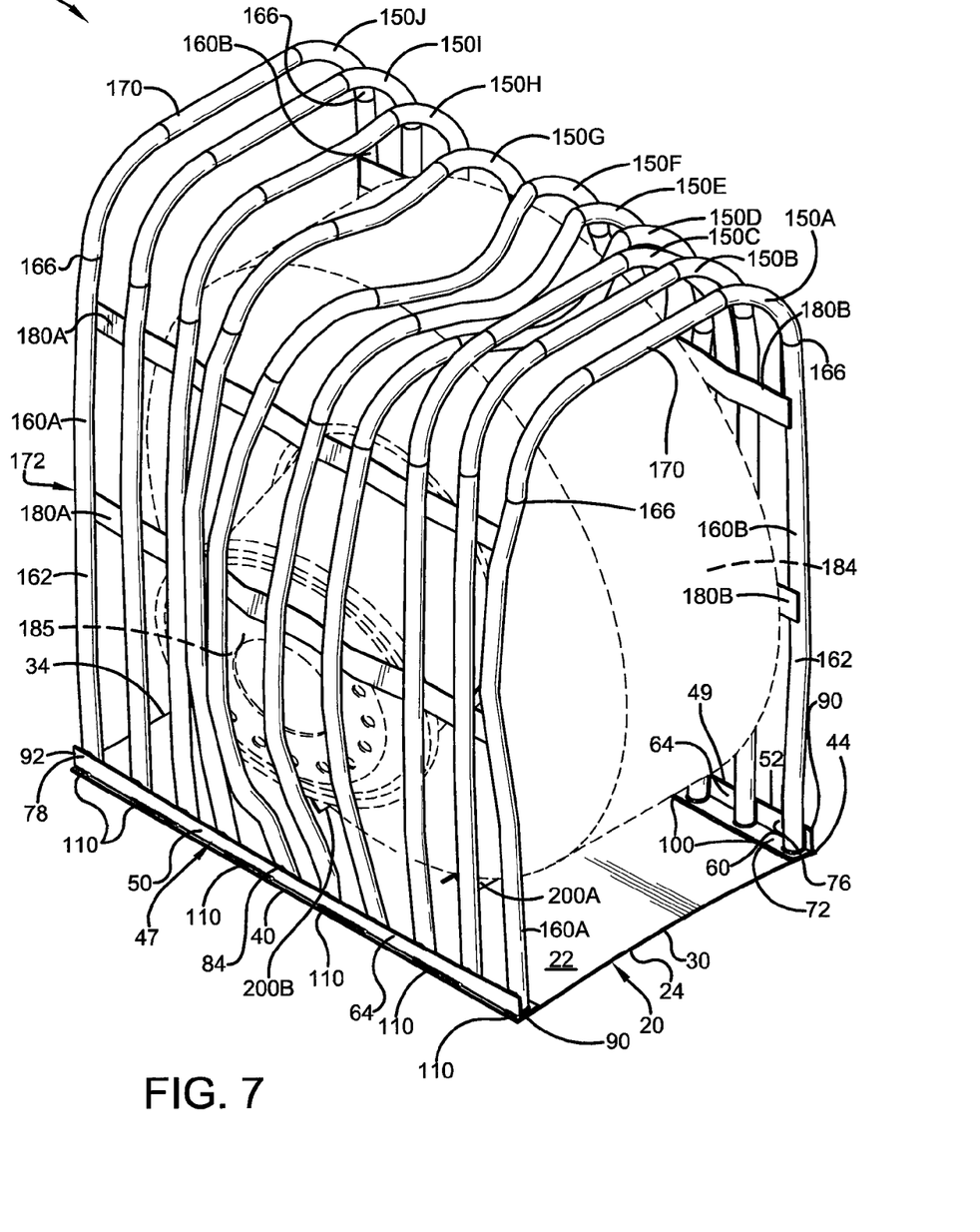
FIG. 7 is a perspective view of the tire inflation cage after a tire has exploded and/or rim has separated, showing the continued attachment of the retention members to the base in accordance with the concepts of the present invention.

Thus, by attaching support members 47 and 49, as previously discussed with regard to the various embodiments set forth above, to the outside surface 162 of the upstanding members 160A and 160B at a point proximate to the end 164, allows the retention members 160A-B to be attached to the base 20 with increased shear strength. Thus, during inflation when the wheel 185 separates from the tire 184 and/or the tire 184 explodes, the retention members 150 absorbs the energy, such that the upstanding members 160A-B remain attached to the base 20, as shown in FIG. 7.

Figure 8:
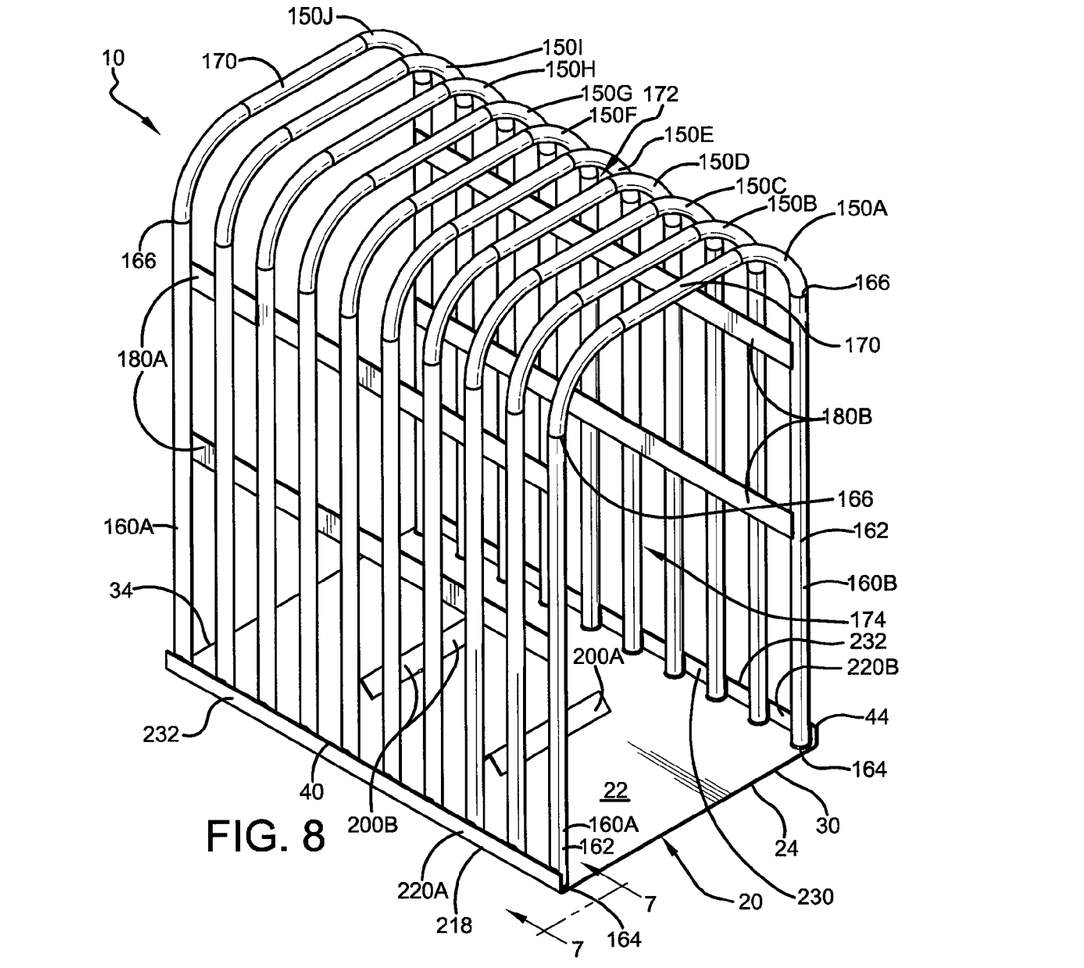
FIG. 8 is a perspective view of an alternative tire inflation cage in accordance with the concepts of the present invention.
Figure 9:
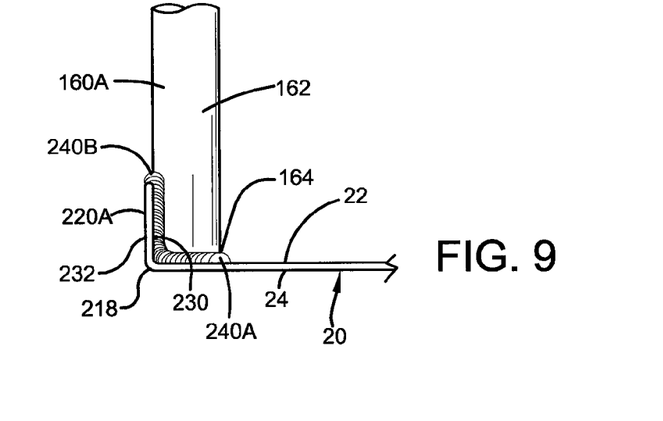
FIG. 9 is an elevational view showing the attachment of a retention member to a base of the alternative tire inflation cage in accordance with the concepts of the present invention.

Still another embodiment of the tire cage 10 is shown in FIGS. 8-9 of the drawings and includes a base 20 that is modified such that the support members 47,49 or angle members 50,52 are replaced by upturning the lateral edges 40 and 42 of the base 20 at an edge 218 so that they are at a substantially right angle to the upper surface 22 of the base 20. In other words, the lateral edges 40 and 42 of the base 20 are upturned at a substantially right angle to the upper surface 22 to form respective support walls or support members 220A and 220B having opposed inner and outer surfaces 230 and 232. As such, the ends 164 of the upstanding members 160A and 160B are respectively attached to the upper surface 22 of the base 20 at a point adjacent to the inner surface 230 of the support walls 220A and 220B by weld 240A. In addition, the outer surface 162 of the upstanding members 160A and 160B that is proximate to the end 164 is attached to the inner surface 230 of respective support walls 220A and 220B by weld 240B. It should be appreciated that the manner for attachment of the upstanding members 160A and 160B to the base 20 and to respective support walls 220A-B may be by welding or any other suitable manner of attachment.

Another embodiment of a tire inflation cage is referred to by numeral 300, as shown in FIGS. 10-13 of the drawings. Specifically, the tire inflation cage 300 includes the support members 47 and 49 that comprise respective spaced angle members 50 and 52, as previously discussed. The ends 90 and 92 of each of the angle members 50 and 52 are joined together by a base, such as flat iron members, that comprise respective cross-connection members 310A and 310B. In one aspect, the cross-connection members 310A-B are attached to the inner surface 72 of the base section 60 of the angle members 50 and 52 by welds 312 or any other suitable means of attachment. Also attached between the angle members 50 and 52 by any suitable means of attachment, including welding are tire stops 200A and 200B, which have been previously discussed. Specifically, the tire stops 200A and 200B are welded or attached to the inner surface 72 of the base section 60 and to the inner surface 76 of the support section 64 of the angle members 50 and 52. In addition, the tire stops 200A-B are spaced apart a suitable distance to enable the support of a tire therebetween. In one aspect, the tire stops 200A-B may be each constructed of 1 inch×1 inch×⅛ inch inverted angle iron for example.

Figure 10:
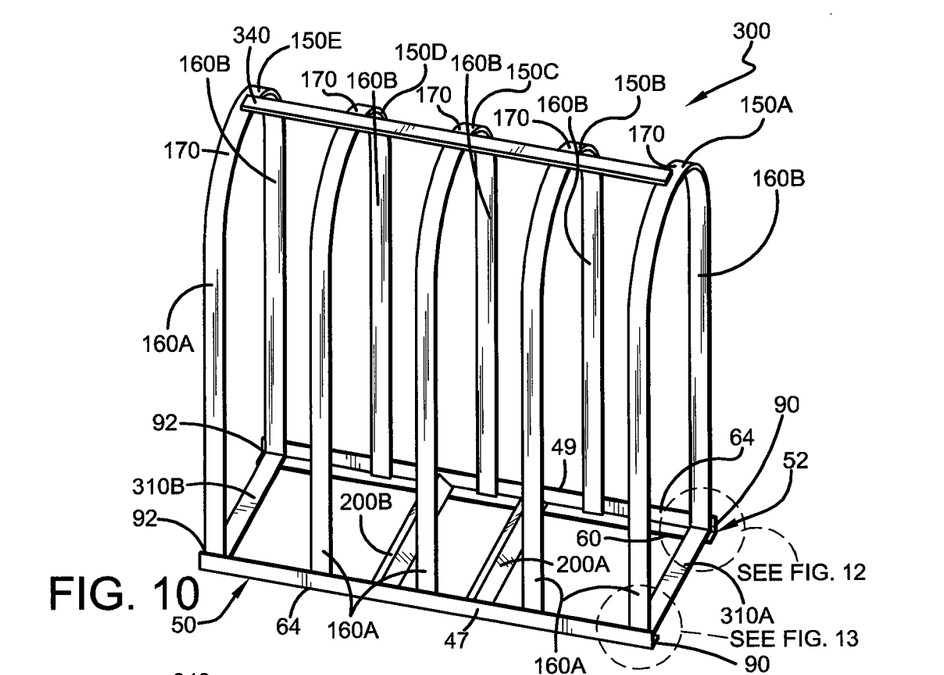
FIG. 10 is a perspective view of another alternative tire inflation cage in accordance with the concepts of the present invention.
Figure 11:
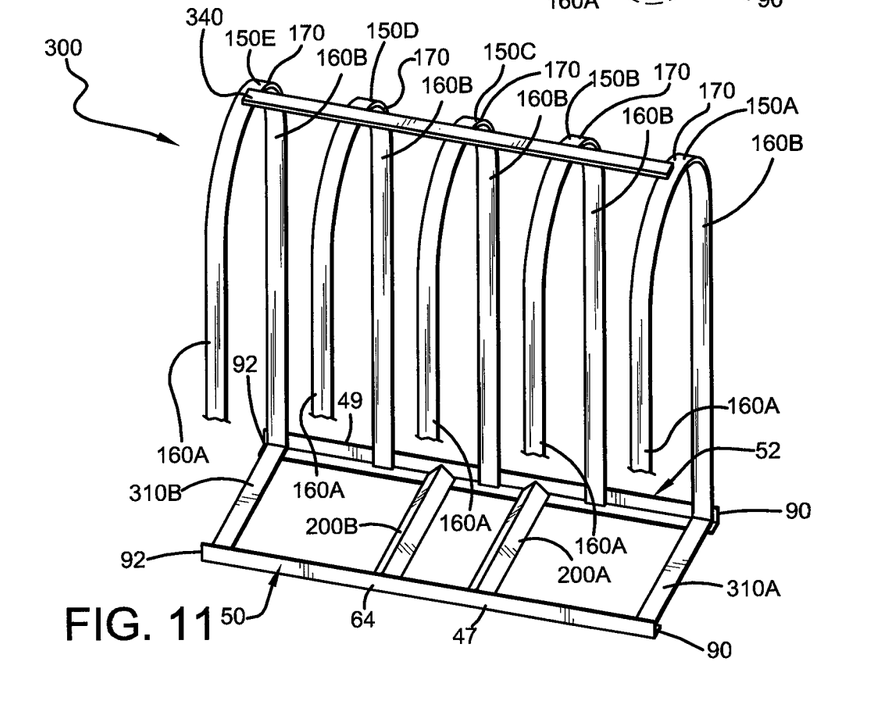
FIG. 11 is another perspective view of the alternative tire inflation cage in accordance with the concepts of the present invention.
Figure 12:
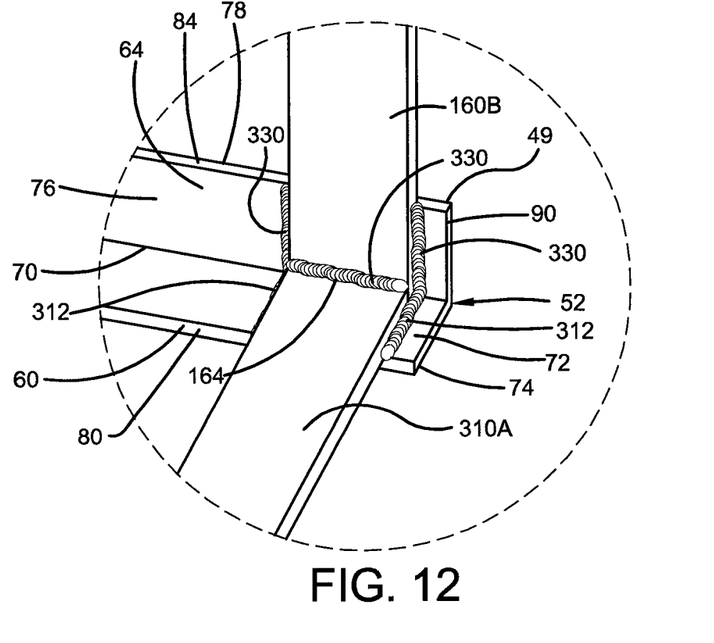
FIG. 12 is a perspective view of a plurality of retention members attached to an angle member of the alternative tire inflation cage in accordance with the concepts of the present invention.
Figure 13:
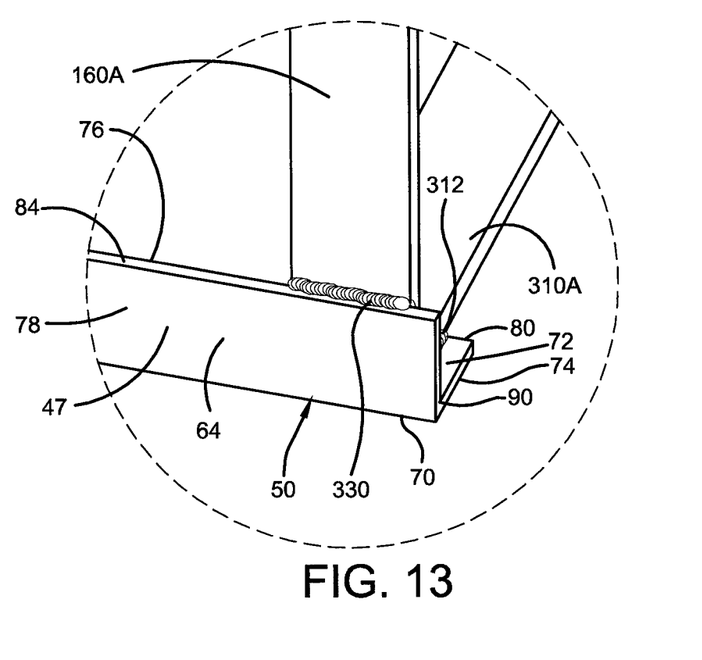
FIG. 13 is another perspective view of a plurality of other retention members attached to another angle member of the alternate tire inflation cage in accordance with the concepts of the present invention.

The tire inflation cage 300 also provides the retention members 150A-E as previously discussed, such that the end 164 of each upstanding member 160A and 160B is attached by welds 330 or other suitable means of attachment to the inner surface 76 of the support section 64 of respective angle members 50 and 52, as shown in FIGS. 10 and 11. Finally, a brace 340 is attached to the joining member 170, to allow any impact forces from the tire 184 and rim or wheel 185 to be more evenly distributed among the retention members 150A-E. It is also contemplated that the retention members 150A-E, brace 340 and cross members 310 may be formed from material having any suitable cross-section, including a substantially rectangular cross-section for example.

Therefore, one advantage of the present invention is that technicians may situate the tire assembly within a tire inflation cage and then rotate the tire assembly to any desired position, saving time and effort, while increasing safety in the event that the tire explodes and/or the wheel separates into pieces. Another advantage of the present invention is that the tire inflation cage provides retention members that are attached to a base with increased shear strength, so as to prevent the tearing of the retention members away from the base to which they are attached, thus increasing the safety of individuals in and around the tire inflation cage in the event the tire explodes into fragments and/or the wheel separates from the tire.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A tire inflation cage for protecting a user when inflating a tire on a wheel, the tire inflation cage comprising:
   a plurality of retention members spaced along a longitudinal axis of the tire inflation cage, wherein each retention member includes:
      a first upstanding member having a top end and a bottom end;

a second upstanding member, spaced apart from the first upstanding member and having a top and a bottom end; and a cross-member connecting said top ends of said first and second upstanding members, wherein each retention member forms a space for receiving the tire and wheel therein;

a first support member extending along said longitudinal axis and attached outside said space to at least two first upstanding members of at least two retention members proximate to said bottom ends of each said first upstanding members;

a second support member extending along said longitudinal axis and attached outside said space to at least two second upstanding members of at least two retention members proximate to said bottom ends of each second upstanding members; and a base connecting at least the first support member to at least said second support member.

2. The tire inflation cage of claim 1, wherein said first and second upstanding members and said cross-member are formed from a U-shaped tube.

3. The tire inflation cage of claim 1, wherein said first and second support members comprise a strip of metal including a top and bottom edge and an inner and outer surface.

4. The tire inflation cage of claim 3, wherein said inner surface of each said strip of metal is attached to respective first and second upstanding members by a weld.

5. The tire inflation cage of claim 4, wherein each said weld extends between said top and bottom edges of each said first and second support member.

6. The tire inflation cage of claim 1, wherein said first and second support members have a lengthwise dimension, such that said first and second support members are attached along said lengthwise dimension to said base.

7. The tire inflation cage of claim 1, wherein said first and second support members are attached to each said retention member.

8. The tire inflation cage of claim 1, wherein said base further connects said first and second upstanding members.

9. The tire inflation cage of claim 1, further comprising a first brace attached to at least two of said first upstanding members and a second brace attached to at least two of said second upstanding members.

10. The tire inflation cage of claim 1, wherein said first and second support members each include a substantially vertical support section and a substantially horizontal base section, wherein said substantially vertical support sections of both said first and second support members are attached outside the space to said at least two first and second upstanding members, respectively.

11. The tire inflation cage of claim 10, wherein said base includes a flat sheet of metal attached to each said substantially horizontal base section of said first and second support members.

12. The tire inflation cage of claim 11, wherein said substantially vertical support section includes a top and bottom edge and an inner and outer surface, wherein said inner surface of each said substantially vertical support section is attached to respective first and second upstanding members by a weld.

13. The tire inflation cage of claim 12, wherein each said weld extends between said top and bottom edges of each said substantially vertical support section.

14. The tire inflation cage of claim 11, wherein said flat sheet of metal includes an upper surface and a lower surface, such that said substantially horizontal base section of said first and second support members are attached to said upper surface of said flat sheet of metal.

15. The tire inflation cage of claim 14, wherein said first and second support members are attached to said upper surface of said flat sheet of metal by a plurality of welds that alternate between each side of each said substantially horizontal base section.

16. The tire inflation cage of claim 14, wherein said first and second support members are attached to said upper surface of said flat sheet of metal by at least one weld that extends along a lengthwise dimension of each said substantially horizontal base section of said first and second support members.

17. The tire inflation cage of claim 11, wherein said flat sheet of metal includes an upper surface and a lower surface, such that said substantially horizontal base section of said first and second support members are attached to said lower surface of said flat sheet of metal.

18. The tire inflation cage of claim 17, wherein said first and second support members are attached to said lower surface of said flat sheet of metal by at least one weld that extends along a lengthwise dimension of each said substantially horizontal base section of said first and second support members.

19. The tire inflation cage of claim 1, wherein said base and said first and second support members are formed integrally as one piece without a weld between said base and said first or second support members.

20. The tire inflation cage of claim 19, wherein said first and second support members are each substantially vertical upturned sections of said base, and include a top and bottom edge and an inner and outer surface, wherein said inner surface of each said substantially vertical upturned section is attached to said respective first and second upstanding members by a weld.

21. The tire inflation cage of claim 20, wherein each said weld extends between said top and bottom edges of each said substantially vertical upturned section.

22. The tire inflation cage of claim 21, wherein each said weld extends around said first or second upstanding member.

* * * * *